United States Patent
Cope (12)

(10) Patent No.: US 6,707,888 B1
(45) Date of Patent: Mar. 16, 2004

(54) LOCATION EVALUATION FOR CALLERS THAT PLACE EMERGENCY TELEPHONE CALLS OVER PACKET NETWORKS

(75) Inventor: Warren B. Cope, Olathe, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 109 days.

(21) Appl. No.: 10/139,771

(22) Filed: May 6, 2002

(51) Int. Cl.[7] .............................................. H04M 11/04
(52) U.S. Cl. .............................. 379/45; 379/37; 379/40
(58) Field of Search ......................... 379/37–51, 93.09, 379/93.01–93.08, 90.01, 93.37, 242, 243

(56) References Cited

U.S. PATENT DOCUMENTS 6,028,915 A * 2/2000 McNevin ..................... 379/49
6,201,856 B1 * 3/2001 Orwick et al. ................ 379/40
6,587,546 B2 * 7/2003 Stumer et al. ................ 379/37

* cited by examiner

Primary Examiner—Wing Fu Chan (57) ABSTRACT

A service node receives an emergency telephone call from a packet network. The service node processes a source packet address for the emergency telephone call based on first packet address characteristics to determine if the caller is at the first location. The service node transfers the emergency telephone call with a first indication that the caller is at the first location if the caller is at the first location and transfers the emergency telephone call with a second indication that the caller is not at the first location if the caller is not at the first location. A location server receives a query for the emergency telephone call indicating the source packet address, processes the source packet address based on packet address characteristics to determine the current location of the caller, and transfers a response indicating the current location.

33 Claims, 3 Drawing Sheets

LOCATION EVALUATION FOR CALLERS THAT PLACE EMERGENCY TELEPHONE CALLS OVER PACKET NETWORKS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to technologies for handling emergency telephone calls placed over packet networks.

2. Description of the Prior Art

The Public Switched Telephone Network (PSTN) provides emergency telephone calling services. On an emergency telephone call, the caller places a telephone call to the PSTN using an emergency telephone number such as 911. The PSTN processes the emergency telephone number to connect the caller to an emergency service. The emergency service typically includes emergency operators and emergency response units. The emergency operators answer the emergency telephone calls and provide an interface between the caller and the emergency response units. The emergency response units include fire departments, police departments, ambulance services, and other groups that respond to emergency situations.

There are several different emergency services that typically serve different geographic areas. On emergency telephone calls, the PSTN processes caller telephone numbers to route the emergency telephone call to the proper emergency service for the caller's geographic location. The PSTN also provides the caller telephone numbers to the emergency service, and the emergency service translates the caller telephone numbers into geographic addresses. In this way, emergency response units may travel to the geographic locations of the callers—even if the callers are unable to provide their current location.

For example, if the caller places an emergency telephone call from their home, the PSTN processes the caller's home telephone number to route the emergency telephone call to the emergency service that serves the caller's home location. The PSTN also transfers the caller's home telephone number to this emergency service. The emergency service processes the caller's home telephone number to determine the caller's home address. Emergency response units can then travel to the caller's home even if the caller is unable to communicate their current location to the emergency operator.

When an emergency telephone call is placed from a mobile telephone, the PSTN determines the general location of the caller and routes the emergency telephone call to the emergency service for the general location. Since the telephone number of the mobile telephone does not indicate a caller location like a home telephone number, the emergency service is unable to consistently translate the mobile telephone number into a geographic address for the caller's current location. To address this situation, the PSTN notifies the emergency service that the emergency telephone call has been placed from a mobile telephone, and typically, the emergency operator asks the caller for their current location.

Access to packet networks such as the Internet is now available at multiple locations across a wide geographic area. Packet telephone services have been developed to allow telephone calls over the packet networks. On a packet telephone call, a packet telephone is coupled to a packet network interface. The packet telephone transfer a call request over the packet network to a service node. The service node extends the call request to a destination on the packet network or to a destination on the PSTN. For a destination on the PSTN, the packet telephone transfers call communications over the packet network to the service node, and the service node transfers the call communications to the destination over the PSTN. Likewise, the destination transfers call communications to the service node over the PSTN, and the service node transfers the call communications to the packet telephone over the packet network. Additional details for this type of conventional packet telephone call are discussed below with respect to FIG. 1.

Unfortunately, if a caller places an emergency telephone call from a packet telephone over a packet network, the service node may not be able to effectively determine the caller's location. For example, the caller may travel and stay in a hotel that has a packet network interface in the hotel room. If the caller uses a packet telephone to place an emergency telephone call from their hotel room, the service node cannot effectively determine the caller's location. Technologies are needed to address this situation.

SUMMARY OF THE INVENTION

The invention helps solve the above problems with technologies that address emergency telephone calls over packet networks. Advantageously, emergency services are directed to the caller's home if the caller places an emergency telephone call over a packet network from their home. If the caller places the emergency telephone call over the packet network from a different location, then this condition is noted, so that the caller's current location may be obtained—either from the caller or through other techniques.

Examples of the invention include service nodes, location servers, methods of operation, and software products for an emergency telephone call placed from a caller over a packet network. The methods of operation include methods of operating service nodes and location servers. The software products include software that directs processing system operation and a storage system that stores the software.

Some examples of the invention include a service node that comprises a packet network interface and a processing system. The packet network interface is configured to receive the emergency telephone call from the packet network. The processing system is configured to process a source packet address for the emergency telephone call based on first packet address characteristics for a first location to determine if the caller is at the first location. The processing system is configured to direct a transfer of the emergency telephone call with a first indication that the caller is at the first location if the caller is at the first location. The processing system is configured to direct a transfer of the emergency telephone call with a second indication that the caller is not at the first location if the caller is not at the first location.

In some examples of the invention, the processing system is configured to determine a match between -portions of the source packet address for the emergency telephone call and a first packet address for the first location to determine if the caller is at the first location.

In some examples of the invention, the source packet address for the emergency telephone call comprises a source Internet address. The processing system is configured to determine a match of class A and class B digits between the source Internet address and a first Internet address for the first location to determine if the caller is at the first location.

In some examples of the invention, the processing system is configured to process the source packet address for the emergency telephone call based on second packet address characteristics for a second location to determine if the caller is at the second location. The second indication indicates the second location.

In some examples of the invention, the processing system is configured to direct a transfer of a query indicating the source packet address for the emergency telephone call and process a response indicating the second location to determine if the caller is at the second location.

In some examples of the invention, the first location comprises a caller home

In some examples of the invention, the service node further comprises a public telephone network interface. The processing system is configured to direct a transfer of the emergency telephone call through the public telephone network interface to a public telephone network. The first indication comprises a telephone number for the first location.

In some examples of the invention, the packet network interface is configured to exchange emergency telephone call communications with a caller telephone over the packet network. The service node further comprises a public telephone network interface configured to exchange the emergency telephone call communications with an emergency service over a public telephone network.

Some examples of the invention include a location server that comprises a processing system and a communication interface. The processing system is configured to process a source packet address for the emergency telephone call based on packet address characteristics for a current location of the caller to determine the current location of the caller. The communication interface is configured to receive a query for the emergency telephone call indicating the source packet address and transfer a response for the emergency telephone call indicating the current location.

BRIEF DESCRIPTION OF THE DRAWINGS

The same reference number represents the same element on all drawings.

DETAILED DESCRIPTION OF THE PREFERRED EMBODIMENT

Figure 1:
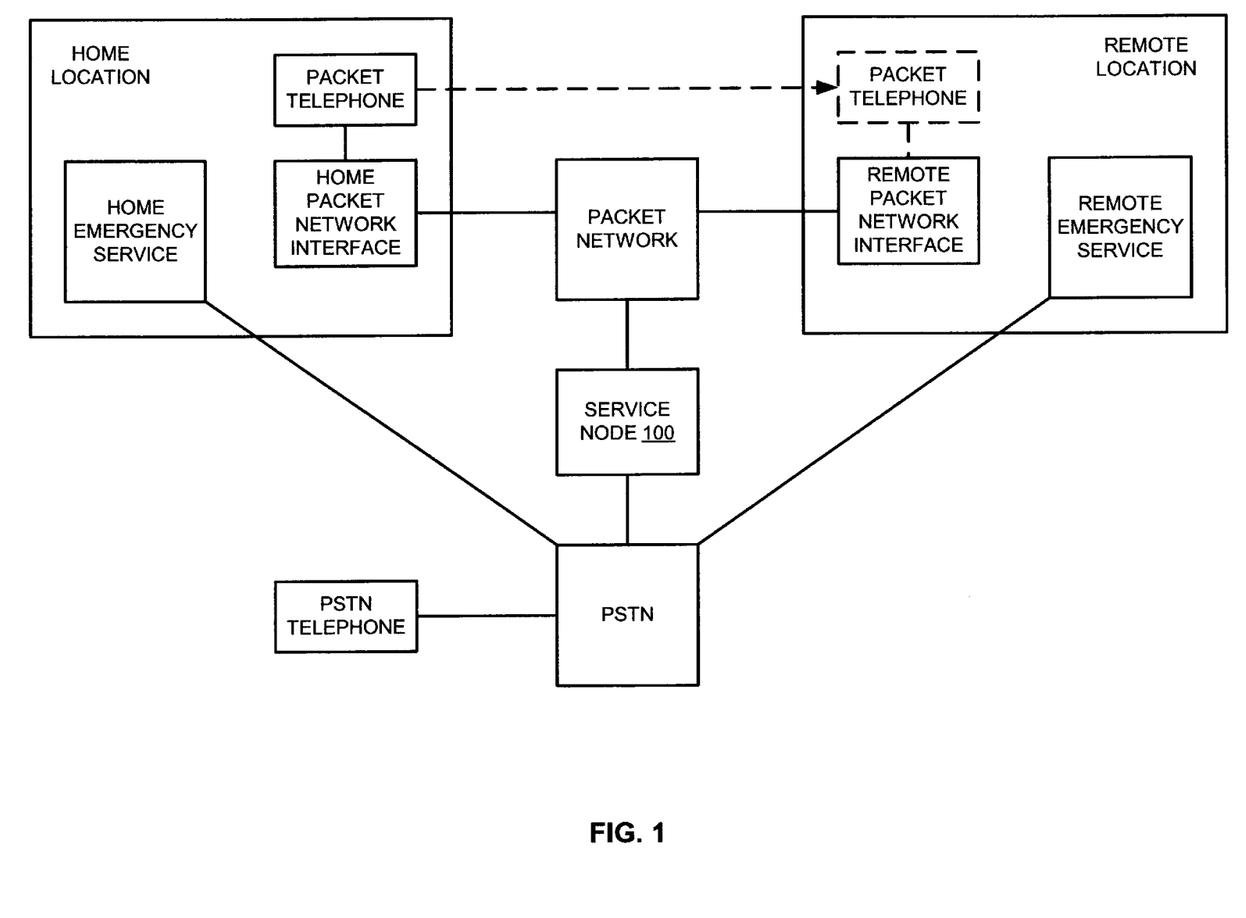
FIG. 1 illustrates a service node and its operating environment in an example of the invention.
Figure 2:
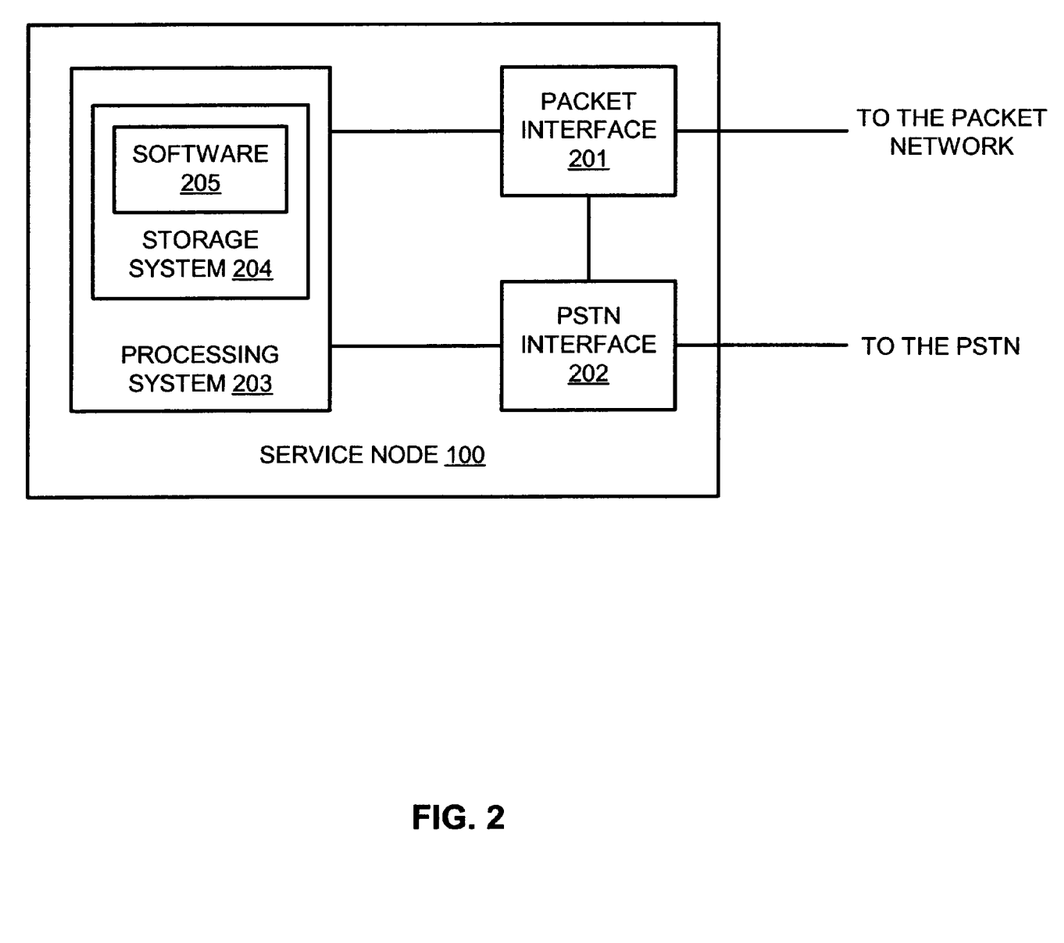
FIG. 2 illustrates a service node in an example of the invention.
Figure 3:
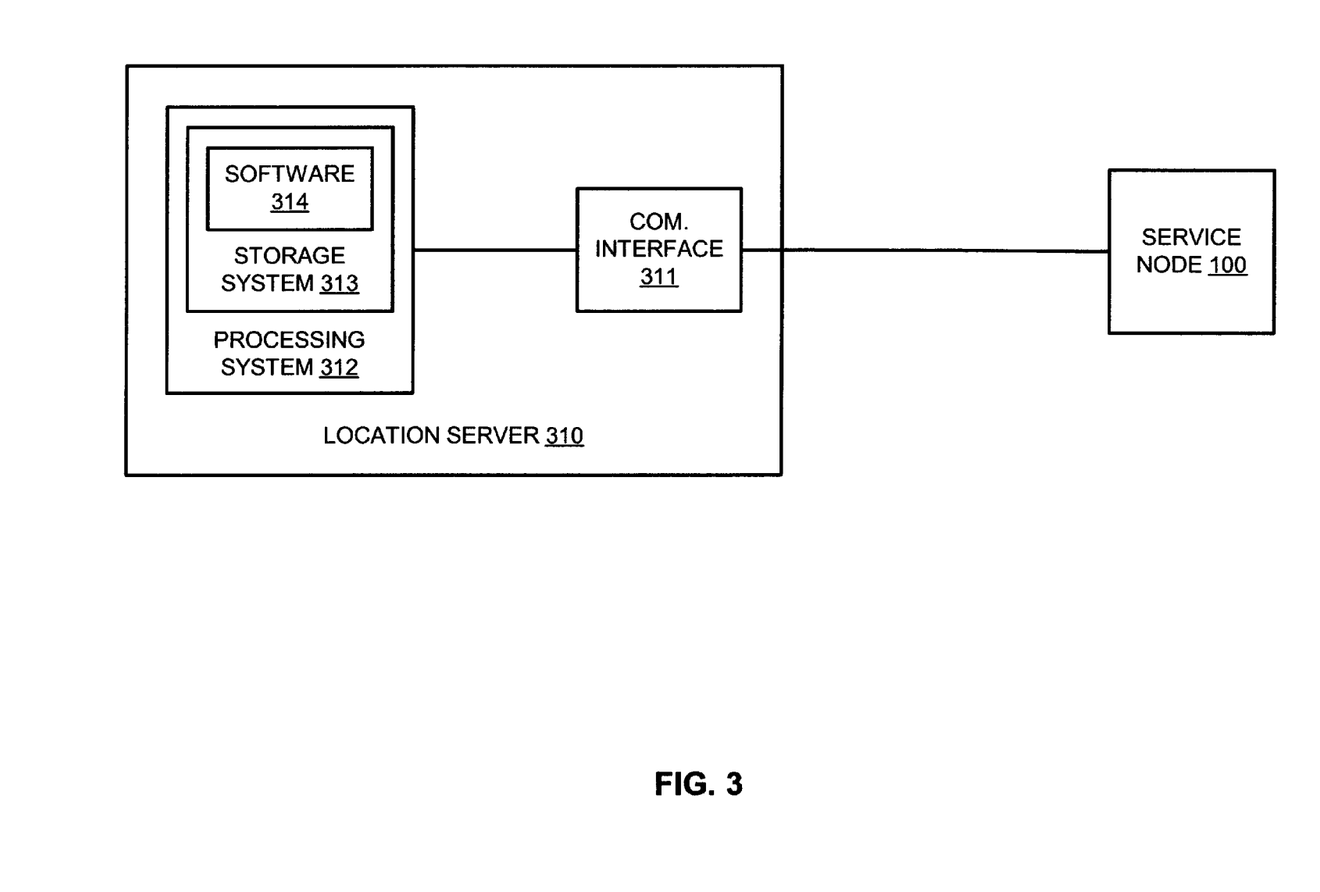
FIG. 3 illustrates a location server in an example of the invention.

FIGS. 1–3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

System Environment Configuration and Operation—FIG. 1

FIG. 1 illustrates service node 100 and its operating environment in an example of the invention. FIG. 1 shows a home location and a remote location. The home location includes a home emergency service and a home packet network interface. The remote location includes a remote emergency service and a remote packet network interface. In some examples, there may be numerous other remote locations that are not shown for clarity.

Home and remote emergency services are linked to the PSTN. Home and remote packet network interfaces are linked to the packet network. The packet network could be the Internet or some other system that transfers packets based on destination addresses in the packets. The packets also include source addresses that indicate the source of the packets. Service node 100 is linked to the packet network and to the PSTN. A conventional PSTN telephone is linked to the PSTN.

The home and remote locations are in different geographic regions that are served by different emergency services. The emergency services typically include emergency operators and emergency response units. The emergency operators answer the emergency telephone calls and provide an interface between the caller and the emergency response units. The emergency response units include fire departments, police departments, ambulance services, and other groups that respond to emergency situations.

Note that a packet telephone is shown connected to the home packet network interface in solid lines and is shown connected to the remote packet network interface in dashed lines. The dashed arrow and the dashed lines represent that the packet telephone is moved from the home location to the remote location. For example, the remote location could be a hotel, and the caller could take the packet telephone from their home to the hotel.

The packet telephone and service node 100 exchange packets through the packet network interfaces and the packet network. For example, the packet telephone and service node 100 could establish an internet protocol tunnel from a packet network interface over a digital subscriber line connection to an Internet service provider, and over the Internet from the Internet service provider to service node 100. The following table indicates a highly simplified addressing scheme using dummy values for the various packet transfers and internet protocol tunnels.

| FROM | TO | SOURCE ADDRESS | DEST. ADDRESS |
| --- | --- | --- | --- |
| PACKET TELEPHONE AT HOME INTERFACE | SERVICE NODE 100 | H | SN |
| SERVICE NODE 100 | PACKET TELEPHONE AT HOME INTERFACE | SN | H |
| PACKET TELEPHONE AT REMOTE INTERFACE | SERVICE NODE 100 | R | SN |

-continued

| FROM | TO | SOURCE AD-DRESS | DEST. AD-DRESS |
|---|---|---|---|
| SERVICE NODE 100 | PACKET TELEPHONE AT REMOTE INTERFACE | SN | R |

The packet address for service node 100 is typically programmed into the packet telephone. The packet addresses for the home and remote locations may be received at log-in to the packet network or may be assigned for use at the packet network interfaces.

On a conventional telephone call through the home packet network interface to the PSTN telephone, the packet telephone transfers a call request to service node 100 from the home packet network interface through the packet network in packets having source address H and destination address SN. The call request indicates the telephone number for the PSTN telephone. In response to the call request, service node 100 transfers a corresponding call request to the PSTN using the telephone number, and the PSTN notifies the PSTN telephone. If the PSTN telephone accepts the call, then the packet telephone transfers call communications to service node 100 from the home packet network interface through the packet network in packets having source address H and destination address SN. Service node 100 forwards the call communications to the PSTN telephone over the PSTN. Likewise, the PSTN telephone transfers call communications to service node 100 over the PSTN. Service node 100 forwards the call communications to the packet telephone through the packet network to the home packet network interface in packets having source address SN and destination address H.

On a conventional telephone call through the remote packet network interface to the PSTN telephone, the packet telephone transfers a call request to service node 100 from the remote packet network interface through the packet network in packets having source address R and destination address SN. The call request indicates the telephone number for the PSTN telephone. In response to the call request, service node 100 transfers a corresponding call request to the PSTN using the telephone number, and the PSTN notifies the PSTN telephone. If the PSTN telephone accepts the call, then the packet telephone transfers call communications to service node 100 from the remote packet network interface through the packet network in packets having source address R and destination address SN. The service node 100 forwards the call communications to the PSTN telephone over the PSTN. Likewise, the PSTN telephone transfers call communications to service node 100 over the PSTN. Service node 100 forwards the call communications to the packet telephone through the packet network to the remote packet network interface in packets having source address SN and destination address R.

On an emergency telephone call from the home location, the packet telephone transfers an emergency telephone call request to service node 100 from the home packet network interface through the packet network in packets having source address H and destination address SN. The call request indicates an emergency telephone number, such as 911. In response to the emergency telephone call request, service node 100 processes the source packet address to determine if the caller is at the home location. This processing is discussed in detail below, but typically includes comparing the source packet address to packet address characteristics for the home location. Since the caller is at the home location for this emergency telephone call, service node 100 transfers a corresponding emergency telephone call request to the PSTN using the emergency telephone number and indicating that the caller is at the home location. This at-home indication could be a corresponding telephone number for the home location that is transferred with the emergency telephone call. Alternatively, the at-home indication could be the actual home address for the caller that was previously provided by the caller and stored for service node 100. Other forms of at-home indication, such as GPS coordinates, could be used in some examples.

Based on the at-home indication and the emergency telephone number, the PSTN routes the emergency telephone call to the home emergency service for the home location. An emergency operator handles the call to initiate an appropriate emergency response from the home emergency service. On the emergency telephone call from the home location, the packet telephone transfers emergency telephone call communications to service node 100 from the home packet network interface through the packet network in packets having source address H and destination address SN. The service node 100 forwards the emergency telephone call communications to the home emergency service over the PSTN. Likewise, the home emergency service transfers emergency telephone call communications to service node 100 over the PSTN. Service node 100 forwards the emergency telephone call communications to the packet telephone through the packet network to the home packet network interface in packets having source address SN and destination address H.

On an emergency telephone call from the remote location, the packet telephone transfers an emergency telephone call request to service node 100 from the remote packet network interface through the packet network in packets having source address R and destination address SN. The emergency telephone call request indicates an emergency telephone number, such as 911. In response to the emergency telephone call request, service node 100 processes the source packet address to determine if the caller is at the home location. This processing is discussed in detail below, but typically includes comparing the source packet address to packet address characteristics for the home location. Since the caller is not at the home location for this emergency telephone call, various actions may be taken in various examples of the invention.

In some examples, service node 100 transfers a corresponding emergency telephone call request to the PSTN using the emergency telephone number and indicating the caller is not at the home location. The PSTN could transfer the emergency telephone call to an emergency service along with the not-at-home indication. In response to the not-at-home indication, the emergency operator could prompt the caller for their remote location and initiate emergency response units accordingly. Alternatively, the PSTN could prompt the caller for their remote location in response to the not-at-home indication, and then route the emergency telephone call to the remote emergency service for the remote location.

In some examples, service node 100 could prompt the caller for their remote location in response to the not-at-home indication. Service node 100 could then transfer a corresponding emergency telephone call request to the PSTN using the emergency telephone number and indicating the remote location. The remote location indication could be a corresponding telephone number for the remote location that is transferred with the emergency telephone call.

Alternatively, the remote location indication could be a remote address as collected from the caller. Other forms of at remote location indication, such as GPS coordinates, could be used in some examples. Based on the remote location indication and the emergency telephone number, the PSTN routes the emergency telephone call to the remote emergency service for the remote location. The emergency services operator would then initiate emergency response units accordingly.

In some examples, service node 100 could determine the current caller location based on the source address. This determination could be a translation of the source address into a location. In some examples, this translation could occur in a location server that is remote from service node 100. Service node 100 could then transfer a corresponding emergency telephone call request to the PSTN using the emergency telephone number and indicating the remote location. The remote location indication could be a corresponding telephone number for the remote location that is transferred with the emergency telephone call. Alternatively, the remote location indication could be a remote address. Other forms of remote location indication, such as GPS coordinates, could be used in some examples. Based on the remote location indication and the emergency telephone number, the PSTN routes the emergency telephone call to the remote emergency service for the remote location. The emergency services operator would then initiate emergency response units accordingly.

On the emergency telephone call from the remote location, the packet telephone transfers emergency telephone call communications to service node 100 from the remote packet network interface through the packet network in packets having source address R and destination address SN. The service node 100 forwards the emergency telephone call communications to the remote emergency service over the PSTN. Likewise, the remote emergency service transfers emergency telephone call communications to service node 100 over the PSTN. Service node 100 forwards the emergency telephone call communications to the packet telephone through the packet network to the remote packet network interface in packets having source address SN and destination address R.

In some examples of the invention, service node 100 could communicate with emergency services, operator centers, and/or the PSTN over packet connections. Thus, the use of conventional PSTN connections as described above would be replaced by packet connections.

Service Node Configuration and Operation—FIG. 2

FIG. 2 illustrates service node 100 in an example of the invention. Service node 100 includes packet network interface 201, PSTN interface 202, and processing system 203. Processing system 203 includes storage system 204. Storage system 204 includes software 205. Packet network interface 201, PSTN interface 202, and processing system 203 are linked together. Service node 100 could be comprised of programmed general-purpose computer and conventional communications equipment, although those skilled in the art will appreciate that programmable or special purpose circuitry and equipment may be used. Service node 100 may use a client server architecture where operations are distributed among a server system and client devices that together comprise elements 201–205. Based on this disclosure, those skilled in the art will appreciate how to modify and configure existing computer and communication systems to make service node 100.

Packet network interface 201 is configured to exchange packets with the packet network. The packets carry call requests and call communications, and may use the above-described addressing scheme. PSTN interface 202 is configured to exchange call signaling and communications with the PSTN. Interfaces 201–202 could be conventional.

Processing system 203 could comprise a computer microprocessor, logic circuit, or some other processing devices. Processing system 203 may be distributed among multiple processing devices. Storage system 204 could comprise a disk, tape, integrated circuit, server, or some other memory device. Storage system 204 may be distributed among multiple memory devices. Processing system 203 retrieves and executes software 205 from storage system 204. Software 205 could comprise an application program, firmware, or some other form of machine-readable processing instructions. When executed by processing system 203, software 205 directs processing system 203 to control service node 100 operation as described herein.

On a non-emergency packet telephone call, packet interface 210 receives a call request from the packet telephone over the packet network. Processing system 203 processes the call request to determine if the call is on-net. If the call is on-net, then processing system 203 transfers a call request through packet interface 201 over the packet network to the destination. If the destination accepts the call, then both the packet telephone and the destination exchange packets that carry call communications with packet interface 201. Under the control of processing system 203, packet interface 202, transfers the call communications from the destination in packets to the packet telephone, and transfers the call communications from the packet telephone in packets to the destination.

If the non-emergency packet telephone call is an off-net, then processing system 203 transfers a call request through PSTN interface 202 to the PSTN, and the PSTN transfers a corresponding call request to the destination. Typically, PSTN interface 202 transfers the call request to the PSTN in the form of PSTN signaling. If the destination accepts the call, then the destination exchanges call communications with PSTN interface 202 over the PSTN, and the packet telephone exchanges packets that carry the call communications with packet interface 101. Interfaces 201–202 may exchange the call communications directly or through processing system 203. Packet interface 201 transfers the call communications from the PSTN in packets over the packet network to the packet telephone. PSTN interface 202 transfers the call communications from the packet telephone over the PSTN to the destination.

If a call is an emergency telephone call from the packet telephone—for example, a call request that indicates an emergency telephone number—then processing system 203 processes the source packet address for the emergency telephone call request to determine if the caller is at their home location. If the caller is at the home location, then processing system 203 directs PSTN interface 202 to transfer an emergency telephone call request to the PSTN using the emergency telephone number and indicating that the caller is at the home location. If the caller is not at the home location on the emergency telephone call from the packet telephone, various actions may be taken in various examples of the invention.

In some examples, processing system 203 could direct PSTN interface 202 to transfer an emergency telephone call request to the PSTN using the emergency telephone number and indicating that the caller is not at the home location. In some examples, processing system 203 could direct packet interface 202 to prompt the caller for their remote location.

In some examples, processing system 203 could determine the current caller location based on the source address for the packet carrying the emergency telephone call request. Processing system 203 could then direct PSTN interface 202 to transfer an emergency telephone call request to the PSTN using the emergency telephone number and indicating the remote location.

Location Server Configuration and Operation—
FIG. 3

FIG. 3 illustrates location server 310 in an example of the invention. Location server 310 includes communication interface 311 and processing system 312. Processing system 312 includes storage system 313. Storage system 313 includes software 314. Communication interface 311 and processing system 312 are linked together. Communication interface 311 is linked to service node 100—possibly over the packet network. Location server 310 could be comprised of programmed general-purpose computer and conventional communications equipment, although those skilled in the art will appreciate that programmable or special purpose circuitry and equipment may be used. Location server 310 may use a client server architecture where operations are distributed among a server system and client devices that together comprise elements 311–314. Based on this disclosure, those skilled in the art will appreciate how to modify and configure existing computer and communication systems to make location server 310.

Communication interface 311 is configured to receive query messages and transfer response messages. Communication interface 311 could be conventional. Processing system 312 could comprise a computer microprocessor, logic circuit, or some other processing device. Processing system 312 may be distributed among multiple processing devices. Storage system 313 could comprise a disk, tape, integrated circuit, server, or some other memory device. Storage system 313 may be distributed among multiple memory devices. Processing system 312 retrieves and executes software 314 from storage system 313. Software 314 could comprise an application program, firmware, or some other form of machine-readable processing instructions. When executed by processing system 312, software 314 directs processing system 312 to control location server 310 operation as described herein.

In some examples, service node 100 makes the determination if the caller at the home location for an emergency telephone call from a packet telephone. If the caller is not at the home location, then service node transfers a query message to communication interface 311. The query message includes the source address from the packet that carried the call request. Processing system 312 translates the source address into a location. Processing system 312 then directs communication interface 311 to transfer a response message back to service node 100 indicating the location.

In some examples, service node 100 transfers a query message to communication interface 311 for an emergency telephone call from the packet telephone. The query message includes the source address from the packet that carried the call request. Processing system 312 determines if the caller is at the home location. If the caller is at the home location, processing system 312 directs communication interface 311 to transfer a response message back to service node 100 indicating that the caller is at the home location. If the caller is not at the home location, then processing system 312 translates the source address into a remote location and directs communication interface 311 to transfer a response message back to service node 100 indicating the remote location.

It should be appreciated that the location evaluations operations described above could be integrated within either service node 100 or location server 310. Alternatively, these location evaluation operations could be distributed in various ways among service node 100 and location server 310.

Packet Source Address Processing

Internet addresses are currently comprised of four sets of digits separated by three periods, such as 111.222.333.444. The first set of digits (111) are referred to as class A digits. The second set of digits (222) are referred to as class B digits. The third set of digits (333) are referred to as class C digits. The fourth set of digits (444) are referred to as class D digits.

An at-home source packet address is be initially collected and stored for subsequent comparison to packet source addresses for emergency telephone call requests. Collection could include prompting a caller on their first call attempt to verify that they are at their home location, and the source address for that call request could be retained for subsequent comparisons. Callers could also provide their internet address to the service node in other ways. For example, the caller may allow service node 100 to obtain the at-home source packet addressing scheme from the caller's Internet service provider.

A caller may have an assigned internet address at their home location. For example, the internet address for the home packet network interface may always be 545.676.898.101. If service node 100 receives a call request packet with a source address of 545.676.898.101, then the caller is at the home location, and processing may proceed accordingly. If service node 100 receives a call request packet with a source address of 545.121.232.343, then the caller is not at the home location, and processing may proceed accordingly.

A caller may receive their internet address when they log-in to the Internet. Although the received internet address may vary within the class D digits or even within the class C digits, the class A and B digits will typically be the same for each internet address received at log-in. For example, on consecutive log-ins, the internet addresses maybe 545.676.898.123 and 545.676.898.456. If service node 100 receives a call request packet with a source address of 545.676.898.789, then the caller is at the home location, and processing may proceed accordingly. If service node 100 receives a call request packet with a source address of 545.232.787.909, then the caller is not at the home location, and processing may proceed accordingly.

Thus, it may be desirable to compare only the A and B classes for the at-home determination. If there is a match of the A and B classes between the at-home source packet address and the source address from the call request packet, then the caller is at home, but if there is no match, then the caller is assumed to be calling from a remote location. Alternatively, it may be desirable to compare only the A, B, and C classes for the at home determination. Thus, if there is a match of the A, B, and C classes between the at-home source packet address and the source address from the call request packet, then the caller is at home, but if there is no match, then the caller is assumed to be calling from a remote location.

Although internet address processing is described above, similar techniques may be used with other sorts of packet addressing or with modifications to the current internet addressing scheme. Essentially, the source address of the emergency telephone call request packet is processed based on known characteristics of a packet address for a particular location to determine if the caller is at the particular location. Based on this disclosure, those skilled in the art will appreciate additional techniques for processing the source address based on known characteristics of a packet address for a particular location to determine if the caller is at the particular location.

The above technique can also be used to determine if a caller is at particular remote locations. In this case, the remote locations would be handled like the home locations, but would use source packet address characteristics for the remote location for the comparison. If there is a match between the source packet address characteristics for the remote location and the source address from the call request packet, then the caller is at the remote location. Thus, a caller may establish source packet address characteristics for their second home, office, and other remote locations of interest.

To determine the caller's location if the caller is not at home or at a pre-determined remote location, a table could be compiled with internet address characteristics on one side and location information on the other. The table could be used to translate source addresses into location information. The table could be compiled manually and may not be comprehensive.

The table could also be compiled dynamically. For example, service node 100 or location server 310 could receive correlations between internet addresses and locations from the packet telephones, the packet network interfaces, or the internet service providers in response to internet address assignments. The correlation could then be loaded into the table for location evaluation.

For example, the packet telephone could be programmed to discover its source packet address and its current location. The source packet address could be obtained from the packet network interface or the Internet service provider. The current location could be obtained from the packet network interface or from the caller. The packet telephone could then transfer a packet over the packet network to service node 100 or location server 310 indicating the source packet address and the current location for use in subsequent emergency telephone call processing. Based on this disclosure, those skilled in the art will appreciate additional techniques for compiling the table.

What is claimed is:

1. A service node for an emergency telephone call placed from a caller over a packet network, the service node comprising:
   a packet network interface configured to receive the emergency telephone call from the packet network; and
   a processing system configured to process a source packet address for the emergency telephone call based on first packet address characteristics for a first location to determine if the caller is at the first location, direct a transfer of the emergency telephone call with a first indication that the caller is at the first location if the caller is at the first location, and direct a transfer of the emergency telephone call with a second indication that the caller is not at the first location if the caller is not at the first location.

2. The service node of claim 1 wherein the processing system is configured to determine a match between portions of the source packet address for the emergency telephone call and a first packet address for the first location to determine if the caller is at the first location.

3. The service node of claim 1 wherein the source packet address for the emergency telephone call comprises a source Internet address and wherein the processing system is configured to determine a match of class A and class B digits between the source Internet address and a first Internet address for the first location to determine if the caller is at the first location.

4. The service node of claim 1 wherein the processing system is configured to process the source packet address for the emergency telephone call based on second packet address characteristics for a second location to determine if the caller is at the second location, and wherein the second indication indicates the second location.

5. The service node of claim 1 wherein the processing system is configured to direct a transfer of a query indicating the source packet address for the emergency telephone call and process a response indicating the second location to determine if the caller is at the second location.

6. The service node of claim 1 wherein the first location comprises a caller home.

7. The service node of claim 1 further comprising a public telephone network interface and wherein the processing system is configured to direct a transfer of the emergency telephone call through the public telephone network interface to a public telephone network and wherein the first indication comprises a telephone number for the first location.

8. The service node of claim 1 wherein the packet network interface is configured to exchange emergency telephone call communications with a caller telephone over the packet network, and further comprising a public telephone network interface configured to exchange the emergency telephone call communications with an emergency service over a public telephone network.

9. A method of operating a service node for an emergency telephone call placed from a caller over a packet network, the method comprising:
   receiving the emergency telephone call from the packet network;
   processing a source packet address for the emergency telephone call based on first packet address characteristics for a first location to determine if the caller is at the first location;
   directing a transfer of the emergency telephone call with a first indication that the caller is at the first location if the caller is at the first location; and
   directing a transfer of the emergency telephone call with a second indication that the caller is not at the first location if the caller is not at the first location.

10. The method of claim 9 wherein processing the source packet address to determine if the caller is at the first location comprises determining a match between portions of the source packet address for the emergency telephone call and a first packet address for the first location.

11. The method of claim 9 wherein the source packet address for the emergency telephone call comprises a source Internet address and wherein processing the source packet address to determine if the caller is at the first location comprises determining a match of class A and class B digits between the source Internet address and a first Internet address for the first location.

12. The method of claim 9 further comprising processing the source packet address for the emergency telephone call based on second packet address characteristics for a second location to determine if the caller is at the second location, and wherein directing the transfer of the emergency telephone call with the second indication comprises directing the transfer of the emergency telephone call with the second indication that indicates the second location.

13. The method of claim 9 wherein processing the source packet address to determine if the caller is at the second location comprises directing a transfer of a query indicating the source packet address for the emergency telephone call and processing a response indicating the second location.

14. The method of claim 9 wherein the first location comprises a caller home.

15. The method of claim 9 wherein directing the transfer of the emergency telephone call with the first indication that the caller is at the first location comprises directing the transfer of the emergency telephone call to a public telephone network with a telephone number for the first location.

16. The method of claim 9 further comprising exchanging emergency telephone call communications with a caller telephone over the packet network, and exchanging the emergency telephone call communications with an emergency service over a public telephone network.

17. A software product for an emergency telephone call placed from a caller over a packet network, the software product comprising:
    software configured to direct a processing system to process a source packet address for the emergency telephone call based on first packet address characteristics for a first location to determine if the caller is at the first location, direct a transfer of the emergency telephone call with a first indication that the caller is at the first location if the caller is at the first location, and direct a transfer of the emergency telephone call with a second indication that the caller is not at the first location if the caller is not at the first location; and
    a storage system that stores the software.

18. The software product of claim 17 wherein the software is configured to direct the processing system to determine a match between portions of the source packet address for the emergency telephone call and a first packet address for the first location to determine if the caller is at the first location.

19. The software product of claim 17 wherein the source packet address for the emergency telephone call comprises a source Internet address and wherein the software is configured to direct the processing system to determine a match of class A and class B digits between the source Internet address and a first Internet address for the first location to determine if the caller is at the first location.

20. The software product of claim 17 wherein the software is configured to direct the processing system to process the source packet address for the emergency telephone call based on second packet address characteristics for a second location to determine if the caller is at the second location, and wherein the second indication indicates the second location.

21. The software product of claim 17 wherein the software is configured to direct the processing system to direct a transfer of a query indicating the source packet address for the emergency telephone call and process a response indicating the second location to determine if the caller is at the second location.

22. The software product of claim 17 wherein the first location comprises a caller home.

23. The software product of claim 17 wherein the software is configured to direct the processing system to direct a transfer of the emergency telephone call to a public telephone network and wherein the first indication comprises a telephone number for the first location.

24. The software product of claim 17 wherein the software is configured to direct an exchange of emergency telephone call communications with a caller telephone over the packet network and an exchange of the emergency telephone call communications with an emergency service over a public telephone network.

25. A location server for an emergency telephone call placed from a caller over a packet network, the location server comprising:
    a processing system configured to process a source packet address for the emergency telephone call based on packet address characteristics for a current location of the caller to determine the current location of the caller; and
    a communication interface configured to receive a query for the emergency telephone call indicating the source packet address and transfer a response for the emergency telephone call indicating the current location.

26. The location server of claim 25 wherein the source packet address for the emergency telephone call comprises a source Internet address and wherein the processing system is configured to determine a match of class A and class B digits between the source Internet address for the emergency telephone call and a location Internet address for the current location to determine the current location of the caller.

27. The location server of claim 25 wherein the current location of the caller comprises a caller home.

28. A method of operating a location server for an emergency telephone call placed from a caller over a packet network, the method comprising:
    receiving a query for the emergency telephone call indicating the source packet address;
    processing the source packet address for the emergency telephone call based on packet address characteristics for a current location of the caller to determine the current location of the caller; and
    transferring a response for the emergency telephone call indicating the current location.

29. The method of claim 28 wherein the source packet address for the emergency telephone call comprises a source Internet address and wherein processing the source packet address to determine the current location of the caller comprises determining a match of class A and class B digits between the source Internet address for the emergency telephone call and a location Internet address for the current location.

30. The method of claim 25 wherein the current location of the caller comprises a caller home.

31. A software product for an emergency telephone call placed from a caller over a packet network, the software product comprising:
    software configured to direct a processing system to process a source packet address for the emergency telephone call based on packet address characteristics for a current location of the caller to determine the current location of the caller; and
    a storage system that stores the software.

32. The software product of claim 31 wherein the source packet address for the emergency telephone call comprises a source Internet address and the software is configured to direct the processing system to determine a match of class A and class B digits between the source Internet address for the emergency telephone call and a location Internet address for the current location to determine the current location of the caller.

33. The software product of claim 31 wherein the current location of the caller comprises a caller home.

\* \* \* \* \*